United States Patent
Ishihara et al.

(10) Patent No.: US 9,065,361 B2
(45) Date of Patent: Jun. 23, 2015

(54) HYBRID CONSTRUCTION MACHINE

(75) Inventors: Shinji Ishihara, Hitachinaka (JP); Shinya Imura, Toride (JP); Seiji Ishida, Hitachinaka (JP); Masatoshi Hoshino, Tsuchiura (JP); Hidetoshi Satake, Ishioka (JP); Takako Satake, legal representative, Ishioka (JP); Manabu Edamura, Kasumigaura (JP); Mitsuo Sonoda, Kasumigaura (JP); Takatoshi Ooki, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 303 days.

(21) Appl. No.: 13/879,429

(22) PCT Filed: Oct. 12, 2011

(86) PCT No.: PCT/JP2011/073437
§ 371 (c)(1),
(2), (4) Date: Apr. 15, 2013

(87) PCT Pub. No.: WO2012/050135
PCT Pub. Date: Apr. 19, 2012

(65) Prior Publication Data
US 2013/0193892 A1    Aug. 1, 2013

(30) Foreign Application Priority Data
Oct. 15, 2010   (JP) .................... 2010-232071

(51) Int. Cl.
*H02P 1/00*   (2006.01)
*H02P 7/00*   (2006.01)
(Continued)

(52) U.S. Cl.
CPC ................ *H02P 7/00* (2013.01); *B60W 10/06* (2013.01); *B60W 10/08* (2013.01); *B60W 10/26* (2013.01); *B60W 20/00* (2013.01); *B60W 2510/0638* (2013.01); *B60W 2510/244* (2013.01); *B60W 2710/0644* (2013.01);
(Continued)

(58) Field of Classification Search
CPC . Y02T 10/7005; Y02T 10/7077; B60W 10/08
USPC ......................... 318/139, 432, 434
See application file for complete search history.

(56) References Cited

U.S. PATENT DOCUMENTS 7,377,876 B2 *   5/2008   Yang .................. 477/3
7,641,009 B2 *   1/2010   Akimoto .............. 180/65.21
(Continued)

FOREIGN PATENT DOCUMENTS

| JP | 2005-83242 | 3/2005 |
| JP | 2009-174447 | 8/2009 |

(Continued)

*Primary Examiner* — Rina Duda
(74) *Attorney, Agent, or Firm* — Baker Botts L.L.P.

(57) ABSTRACT

In a hybrid construction machine, there is provided a drive control device which realizes in, as a simple a structure as possible, control means of a motor generator, which is capable of preventing rapid decreases in the state of charge. The control means, which calculates a motor torque command value to be output to the motor generator, is characterized by calculating the motor torque command value, based on a difference between an actual state-of-charge and a prescribed target state-of-charge and a torque margin obtained by a difference between a maximum torque of an engine determined based on an actual rotational speed of the engine and an actual torque of the engine.

6 Claims, 5 Drawing Sheets

(51) Int. Cl.
*B60W 10/06* (2006.01)
*B60W 10/08* (2006.01)
*B60W 10/26* (2006.01)
*B60W 20/00* (2006.01)
*E02F 9/20* (2006.01)
*B60W 10/30* (2006.01)
*B60K 25/00* (2006.01)
*B60K 25/02* (2006.01)

(52) U.S. Cl.
CPC ... *B60W 2710/083* (2013.01); *B60W 2710/244* (2013.01); *B60Y 2200/412* (2013.01); *E02F 9/2075* (2013.01); *Y02T 10/6286* (2013.01); *B60W 10/30* (2013.01); *B60K 2025/005* (2013.01); *B60K 2025/024* (2013.01)

(56) References Cited

U.S. PATENT DOCUMENTS 7,766,788 B2 * 8/2010 Shamoto .................. 477/3
2010/0256895 A1 * 10/2010 Harada .................. 701/108

FOREIGN PATENT DOCUMENTS

| JP | 2011-47342 | 3/2011 |
| WO | WO 2010/150382 | 12/2010 |

* cited by examiner

HYBRID CONSTRUCTION MACHINE

TECHNICAL FIELD

The present invention relates to a hybrid construction machine suitable for application to a hydraulic construction machine such as a hydraulic excavator, a wheel loader or the like.

BACKGROUND ART

In a hybrid construction machine, it has been known that a lack of output with miniaturization of an engine is compensated by a generator motor to improve fuel consumption. A state of charge of an electric storage device which supplies power to a motor generator that conducts the assist of an engine output, has been set to be a predetermined state of charge during a target operating time.

When, however, the work of a load heavier than intended work is continuously done, there occurs a situation in which an actual state of charge falls below a state of charge prescribed as a target. Thus, when the work is continued in a state in which the actual state of charge is on the level lower than the target state of charge, an engine assist is disabled due to the lack of the state of charge when an engine assist operation is performed by a generator motor, so that an engine stall occurs.

A prior art capable of solving such problems has been proposed in a Patent Document 1. A drive control device according to the prior art is equipped with a state-of-charge detecting means which detects a state of charge. The drive control device determines a specific operation mode on the basis of a predetermined operation of a hydraulic operating part and suppresses a power running assist corresponding to the state of charge using this operation mode as a judgment criterion, thereby preventing rapid decreases in the state of charge.

PRIOR ART DOCUMENT

Patent Document

Patent Document 1: JP-2005-83242-A

SUMMARY OF THE INVENTION

Problems to be Solved by the Invention

The following problems, however, arise in the prior art. The prior art resides in that the suppression of the power running assist corresponding to the state of charge is performed based on the operation mode. To this end, an operation mode discriminating means for determining the state of operation of the hydraulic operating part is required. Also there is needed a power running torque output characteristic of a motor generator corresponding to an engine speed every specific operation mode determined by the operation mode discriminating means. Thus, in addition to the control device increasing in complexity, a structure is provided in which the power running assist amount of the generator motor is given uniquely according to RPM from an output torque characteristic diagram. Unnecessary electric power consumption might therefore occur.

The present invention has been made to solve such problems. It is an object to provide a hybrid construction machine which, when a state of charge is lower than a target state of charge, controls a motor generator so as not to perform an excessive assist, according to the torque of an engine or its output margin and prevents the state of charge from decreasing.

Means for Solving the Problems

In order to achieve the above object, a structure as defined in claim, for example, is adopted.

The present application includes a plurality of means for solving the object. To take one example thereof, however, there is provided a hybrid construction machine equipped with an engine, a motor generator coaxially and mechanically connected to the engine to perform a generator operation and an electric motor operation, and an electric storage device which supplies power to the motor generator, characterized in that the hybrid construction machine has a control means which calculates a motor torque command value to be output to the motor generator. Further, when an actual state of charge of the electric storage device falls below a target state-of-charge set in advance to the electric storage device, the control means calculates the motor torque command value on the basis of a torque margin obtained by a difference between the maximum torque of the engine determined based on an actual rotational speed of the engine and an actual torque of the engine.

Effects of the Invention

According to the present invention, a construction machine is provided that is capable of efficiently using a state of charge in a simple structure.

MODE FOR CARRYING OUT THE INVENTION

An embodiment of the present invention will be described on the basis of the accompanying drawings.

Figure 1:
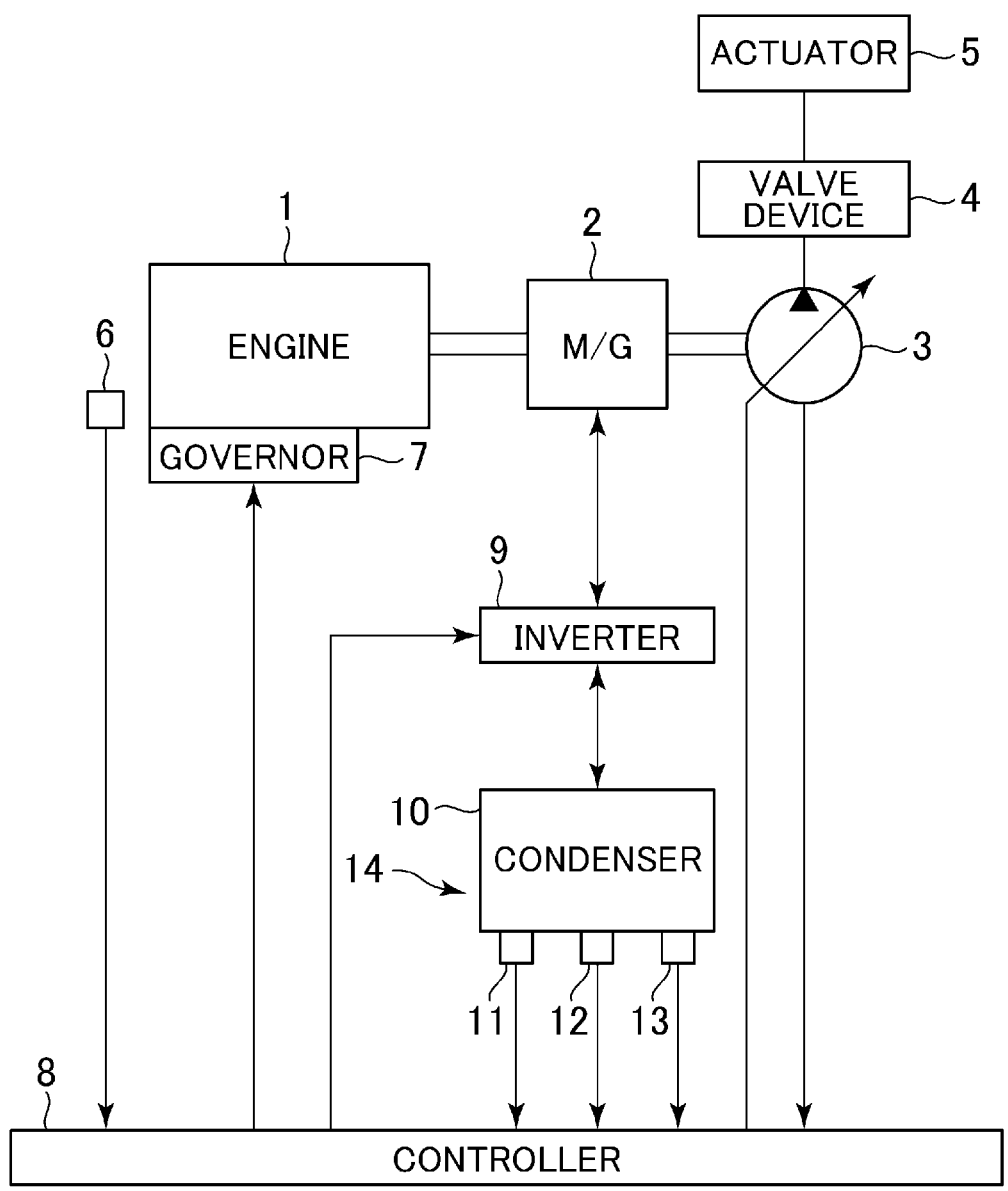
FIG. 1 is a structural diagram of a hydraulic drive control device of a hybrid construction machine in a first embodiment.

FIG. 1 is a structural diagram of a hydraulic drive control device of a hybrid construction machine according to the embodiment of the present invention.

The hydraulic drive control device according to the present embodiment is used for driving of hydraulic operating parts such as a front working device, a swing device, a traveling device, etc. for a hydraulic excavator. As shown in FIG. 1, the hydraulic drive control device has an engine 1, a rotational speed sensor 6 for detecting the rotational speed of the engine 1, a governor 7 for adjusting a fuel injection amount of the engine 1 to thereby adjust the speed of the engine 1, a motor generator 2 mechanically connected to an engine drive shaft, and a variable displacement hydraulic pump 3 (hereinafter described as "hydraulic pump 3") driven by the engine 1 through the motor generator 2. Hydraulic oil discharged from the hydraulic pump 3 is supplied to a hydraulic actuator 5 through a valve device 4. Various operating parts of the hybrid construction machine are driven by the hydraulic actuator 5. Further, the hydraulic drive control device is equipped with an electric storage device 14, an inverter 9 used as a motor generator control means, which controls the rotational speed of the motor generator 2 and performs a transfer of power to and from the electric storage device 14 as needed, and a controller 8. The electric storage device 14 is made up of a condenser 10 comprised of a battery and a capacitor, and a current sensor 11, a voltage sensor 12 and a temperature sensor 13 which are attached to the condenser 10. The electric storage device 14 manages the state of charge through the controller 8 from information such as a current, a voltage, a temperature, etc. detected by these sensors. The controller 8 controls the governor 7 to adjust a fuel injection amount and thereby control an engine rotational speed and controls the inverter 9 to control the torque of the motor generator 2. Incidentally, the controller 8 has a target rotational speed setting means 26 (refer to FIG. 2) which computes as a target rotational speed command value, an operating point where a fuel consumption rate relative to the required output of the engine 1 becomes minimum and thereby makes it possible to realize an improvement in fuel consumption. The speed of the engine 1, which is detected at the rotational speed sensor 6, is inputted to the controller 8.

Figure 3:
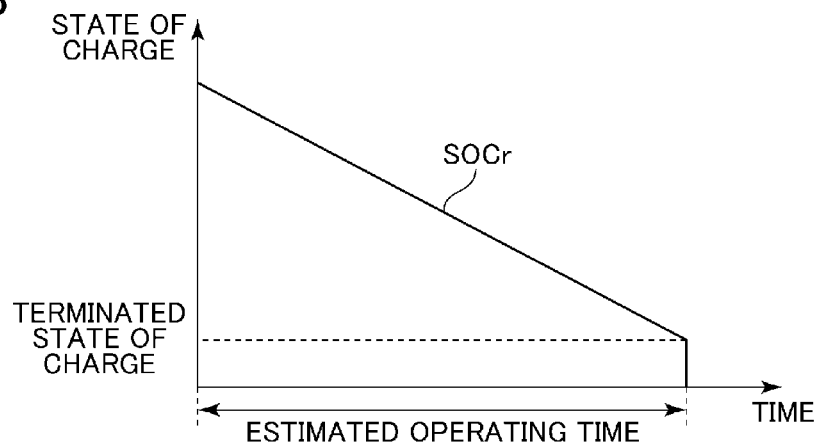
FIG. 3 is a diagram showing a target state of charge with respect to an operating time of an electric storage device in the first embodiment.

FIG. 3 shows a target state of charge (SOCr) with respect to the operating time of the electric storage device 14 according to the present embodiment. As shown in FIG. 3, the state of charge of the condenser 10 during an actual operating time is defined in advance as the target state of charge on the basis of a standard operating time of an intended construction machine, the contents of its work, the capacity of the condenser 10, the terminal electric power amount, etc. Incidentally, the target state of charge can also be renewed as appropriate on the basis of the detected information related to the electric storage device 14. When it is determined that the total quantity of operation becomes smaller than the quantity of operation estimated in advance at a certain time, the target state of charge is taken low, thereby making it possible to make full use of an assist by an assist motor upon subsequent operations. In order to use the state-of-charge efficiently with respect to the target state-of-charge set in this manner, in the present invention, the output of the motor generator 2 is controlled in such a manner that, for example, its output limit like the following is performed.

Figure 4:
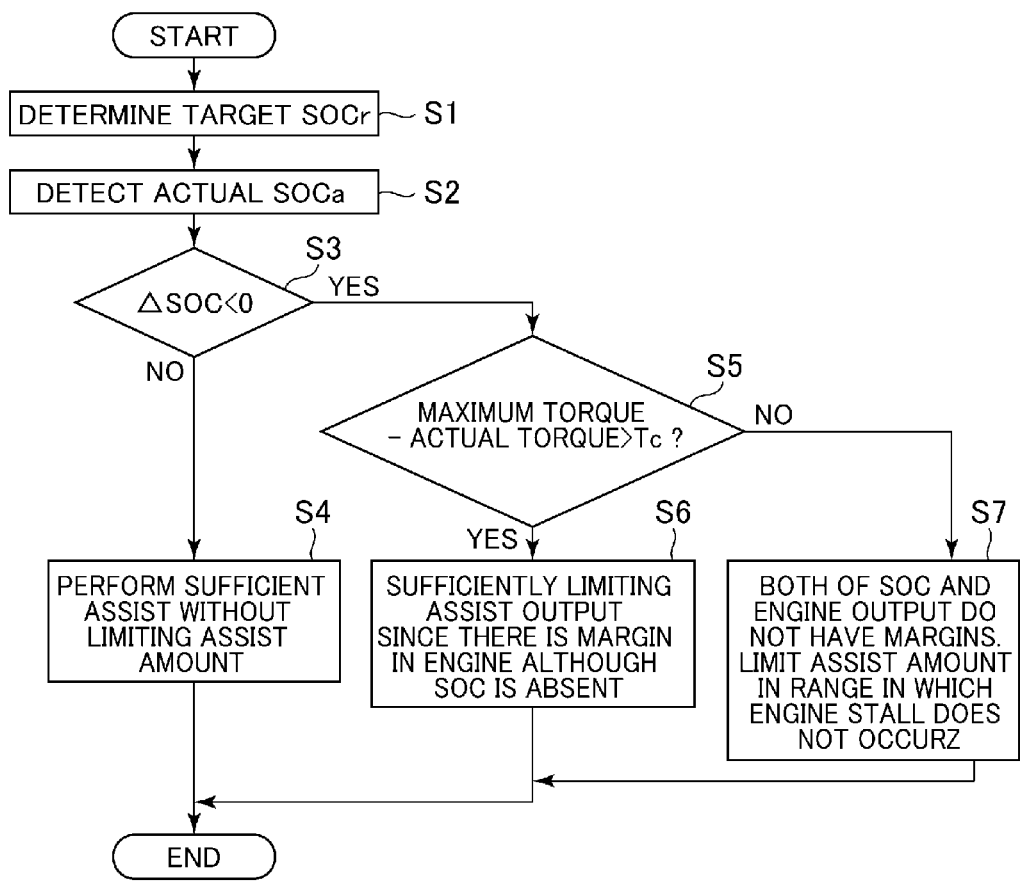
FIG. 4 is a flowchart showing a processing function of the controller 8 in the first embodiment.

FIG. 4 shows a flowchart related to the control in the present embodiment. First, in accordance with Step S1, a target state of charge SOCr at an operating time is determined from such a relationship as shown in FIG. 3, for example. Next, at Step S2, an actual state of charge SOCa is detected by the controller 8, based on the information from the current sensor 11, the voltage sensor 12, the temperature sensor 13 and the like. Next, at Step S3, a deviation $\Delta SOC$ between the actual state of charge SOCa detected as described above, and the target state of charge SOCr is determined by calculation of $\Delta SOC = SOCa - SOCr$. It is determined whether $\Delta SOC$ calculated in this way is $\Delta SOC < 0$. When the determination is "Yes", i.e., $\Delta SOC < 0$, the actual state of charge SOCa falls below the target state of charge SOCr. When the determination is "No", i.e., $\Delta SOC > 0$, the actual state of charge SOCa exceeds the target state of charge SOCr.

Here, when the determination is "No", i.e., $\Delta SOC > 0$ or $\Delta SOC = 0$, sufficient power can be supplied from the electric storage device to the motor generator 2. A sufficient assist of the engine is therefore performed at Step S4 without placing a restriction on an assist output amount output from the motor generator 2. On the other hand, when $\Delta SOC < 0$ is determined to be "Yes", the actual state of charge SOCa falls below the target state of charge SOCr, and sufficient power cannot be supplied from the electric storage device 14 to the motor generator 2. Therefore, at Step S5 and later, a process for placing a restriction on the assist output amount output from the motor generator 2 is performed.

In the present embodiment, when the assist output amount output from the motor generator 2 in this manner is restricted, a torque margin $\Delta T$ is calculated from the difference between the maximum torque Tmax and the actual torque Ta, and a restriction is placed on the assist output amount, based on the torque margin $\Delta T$. Here, the maximum torque Tmax is a maximum value of torque outputtable by the engine with respect to the actual RPM of the engine. The actual torque Ta is torque actually output from the engine with respect to the actual RPM of the engine.

At Step S5, the torque margin $\Delta T$ determined in this manner by being calculated from the difference between the maximum torque Tmax and the actual torque Ta is compared with a threshold value Tc. Here, the threshold value Tc is obtained by, for example, setting a predetermined rate to the maximum torque Tmax with respect to the actual RPM of the engine.

The torque margin $\Delta T$ and the threshold value Tc are compared with each other, and it is determined whether $\Delta T > Tc$. When the determination is found to be "Yes", i.e., the torque margin $\Delta T$ is larger than the threshold value Tc, there is margin in the torque of the engine. Thus, at Step S6, the power supplied from the electric storage device 14 to the motor generator 2 is sufficiently restricted to control required power so as to be obtained from the engine. Such control makes it possible to reduce electric power consumption of the amount of charge of the electric storage device.

On the other hand, when the determination is found to be "No", there is no margin in the engine torque. It is therefore necessary to supply power from the electric storage device 14 to the motor generator 2 and thereby assist the engine. At this time, at Step S7, the assist amount of the motor generator 2 is restricted within a range in which an engine stall does not occur, thereby limiting electric power consumption from the electric storage device 14. Such control enables the electric power consumption of the electric storage device 14 to be reduced without causing the engine stall.

For such control, a series of these controls are repeated in a constant cycle.

Figure 2:
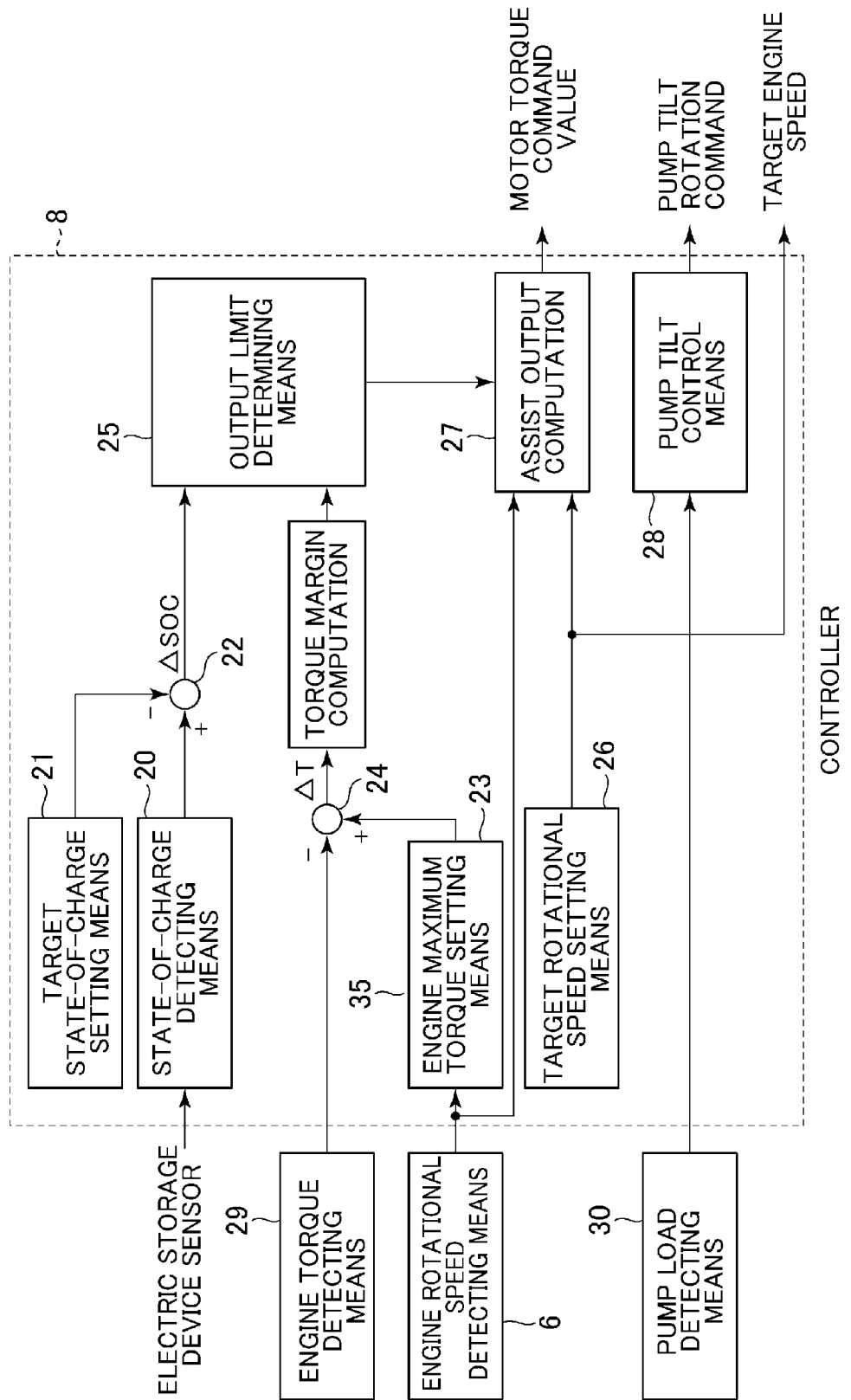
FIG. 2 is a structural diagram of a controller 8 in the first embodiment.

FIG. 2 shows a structure of the controller 8. Controls at respective control parts of the controller 8 will be described in accordance with the above control flow of FIG. 4.

First, a state-of-charge detecting means 20 detects an actual state of charge SOCa on the basis of information about a current, a voltage, a temperature, etc. obtained from the electric storage device sensor comprised of the current sensor 11, voltage sensor 12 and temperature sensor 13. A target state-of-charge setting means 21 sets a target state of charge SOCr relative to such an actual operating time as shown in FIG. 3, for example. A deviation $\Delta SOC$ between the actual state of charge SOCa and the target state of charge SOCr obtained from these means is determined by calculation of $\Delta SOC = SOCa - SOCr$ through a computing unit 22.

The controller 8 receives a rotational speed signal from the rotational speed sensor 6 used as an engine rotational speed detecting means. The rotational speed sensor 6 detects the actual RPM of the engine. Further, the controller 8 has an engine maximum torque setting means 23 which calculates the maximum torque of the engine at the detected actual RPM of engine. Upon a torque margin computation, using the engine maximum torque Tmax and the engine actual torque Ta, the computing unit 24 calculates a torque margin ΔT=Tmax−Ta, that is the difference between the engine maximum torque Tmax calculated by the engine maximum torque setting means 23 and the actual torque of engine Ta detected by an engine torque detecting means 29 provided separated from the controller 8.

The deviation ΔSOC and torque margin ΔT calculated in this way are inputted to an output limit determining means 25. The output limit determining means 25 performs a determination about the following assist output limit as described in FIG. 4. When the deviation ΔSOC>0, i.e., the actual state of charge SOCa exceeds the target state of charge SOCr, sufficient power can be supplied from the electric storage device 14. Therefore, a sufficient engine assist can be carried out by powering the motor generator 2 without its assist output limit. On the other hand, when the deviation ΔSOC<0, i.e., the actual state of charge SOCa falls below the target state of charge SOCr, electric power consumption of the motor generator 2 is reduced by subjecting the motor generator 2 to the assist output limit and power running the same. Here, since there is a margin in the torque of the engine when the torque margin ΔT>Tc, power supplied from the electric storage device 14 to the motor generator 2 is sufficiently restricted. In other words, the assist output amount output from the motor generator 2 is sufficiently restricted. When the deviation ΔSOC<0 and the torque margin ΔT<Tc, there is no margin in the engine torque. It is therefore necessary to supply power from the electric storage device 14 to the motor generator 2 and thereby assist the engine. And the assist output amount is limited up to the range in which the engine stall does not occur, and the motor generator 2 is powered. With the execution of such an output limit, the engine 1 can be assisted by efficiently controlling the state of charge and powering the motor generator 2 in a case where the actual state of charge SOCa falls below the target state of charge SOCr.

The output limit determination as to the electric storage device 14, which is made by the above-described output limit determining means 25, the target rotational speed which is the engine speed determined with respect to the load of a pump at the target rotational speed setting means 26 included in the controller 8 and which is determined as the engine speed good in engine's fuel consumption, and the actual engine speed detected by the engine speed sensor 6 are inputted to an assist output computing means 27.

The assist output computing means 27 calculates a motor torque command value on the basis of the output limit, the target rotational speed and the actual RPM of engine and outputs it to the motor generator 2.

Figure 6:
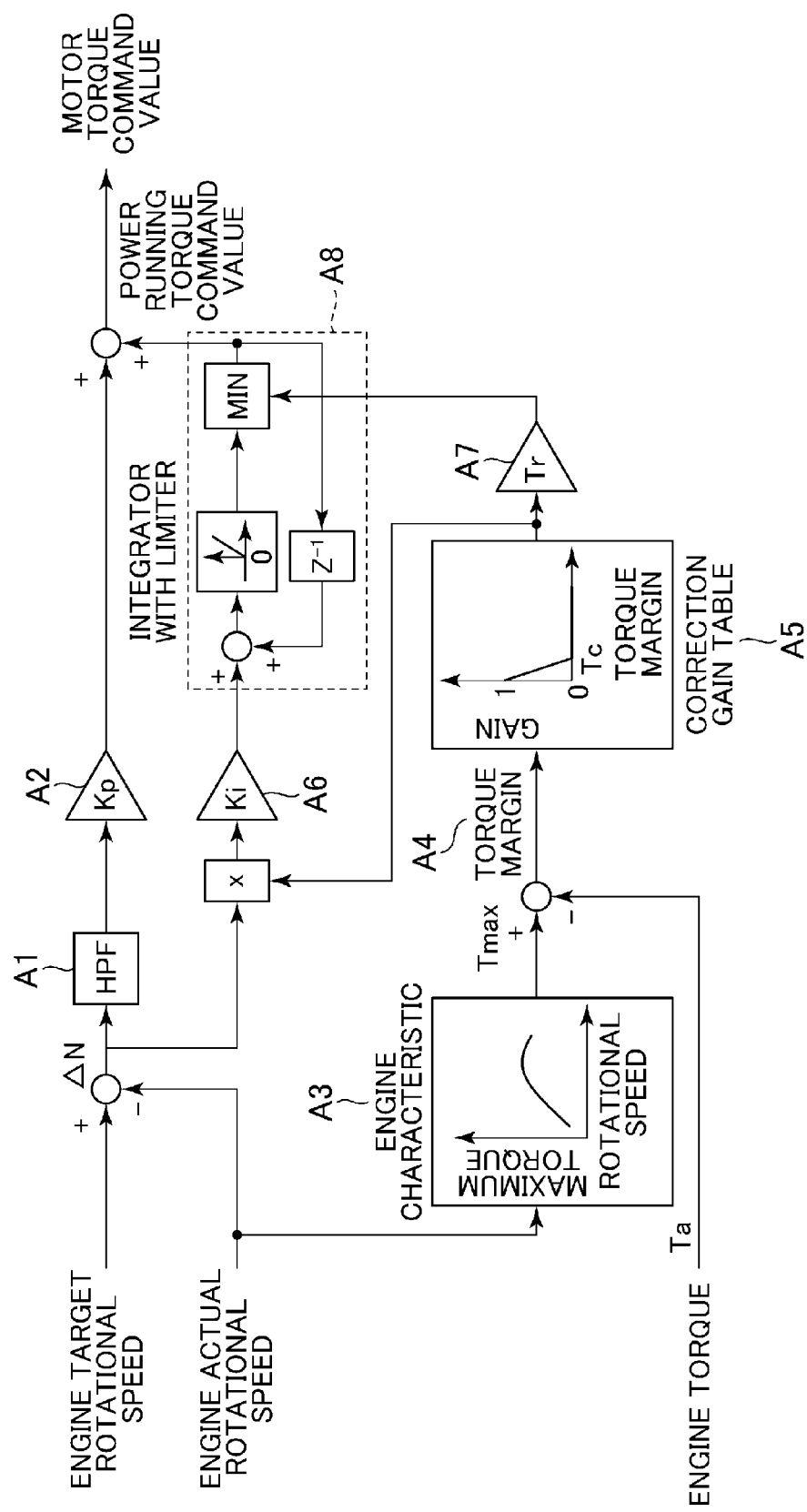
FIG. 6 is a functional block diagram showing a processing function of the controller 8 where a state of charge is smaller than a target state of charge in the first embodiment.

A process of calculating the motor torque command value by the assist output computing means 27 through the output limit determining means 25 will now be explained using FIG. 6. FIG. 6 shows, in a functional block diagram, one example of the overall control function applied for the motor generator 2, which calculates the motor torque command.

First, when the output limit determining means 25 has determined that the deviation ΔSOC>0, a motor torque command is output to the motor generator 2 in such a manner that a sufficient assist is conducted by the motor generator 2. The motor generator 2 is basically performed proportional integral control (hereinafter called PI control) based on a rotational speed deviation ΔN between a target rotational speed of engine and an actual rotational speed of engine. Therefore, the assist output computing means 27 calculates a motor torque command value in accordance with the sum of a power running torque command value and a power running torque command value. The power running torque command value is based on proportional control provided by multiplying the rotational speed deviation between the target rotational speed and the actual rotational speed by proportional gain (Kp) A2 through a high-pass filter (HPF) A1. The power running torque command value is based on integral control provided by multiplying the rotational speed deviation ΔN by integral gain (Ki) A6. Here, upon the integral control, the motor torque command value is calculated through an integrator A8 with a limiter after the rotational speed deviation has been multiplied by the integral gain (Ki) A6. The integrator A8 with a limitation takes the sum of the torque command value obtained by multiplying the rotational speed deviation ΔN by the integral gain (Ki) A6 and the motor torque command value based on the integral control. When the sum thereof is positive, the integrator A8 with a limitation outputs its value as it is. When the sum thereof is negative, the integrator A8 outputs it as 0. Then, the integrator A8 with a limitation places a restriction to avoid the output of more than continuous rated torque of a motor and calculates a power running torque command value based on the integral control.

On the other hand, when it is determined that ΔSOC<0, an assist in which the rotational speed deviation ΔN between the target rotational speed of engine and the actual rotational speed of engine is multiplied by the proportional gain (Kp) A2 through the high-pass filter (HPF) A1 is performed upon P control as with the case where it is determined that the deviation ΔSOC>0, to thereby do output only with respect to a transient rotational speed deviation. It is therefore possible to avoid consumption of power when the rotational speed deviation becomes steady. On the other hand, upon I control, the amount of consumption of steady power can be reduced by performing the following control, for example.

Figure 5:
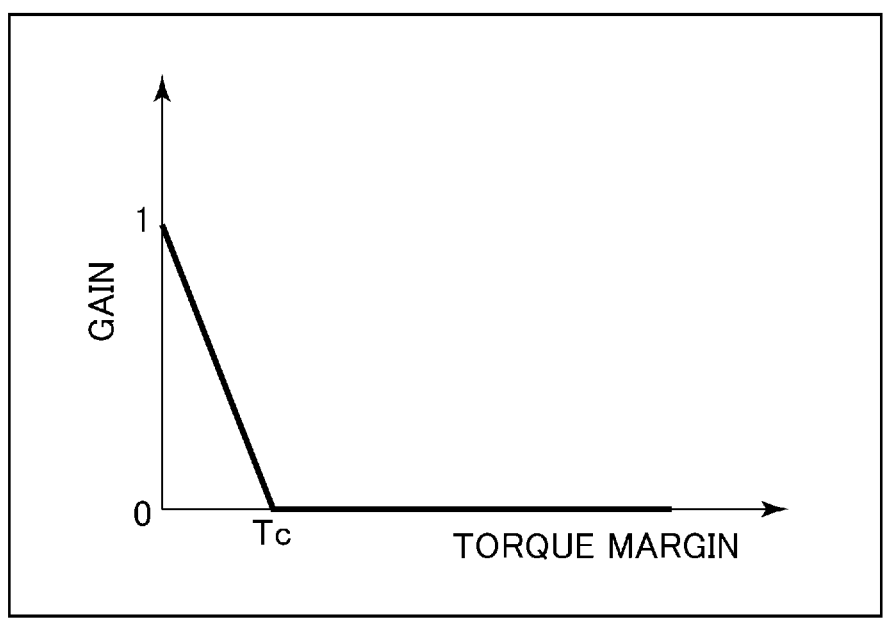
FIG. 5 is a characteristic diagram of correction gain and a torque margin in the first embodiment.

An engine maximum toque Tmax relative to the actual rotational speed of engine is first determined based on an engine characteristic A3 indicative of the characteristic of the engine maximum torque Tmax relative to the actual rotational speed of engine. A difference between the determined engine maximum torque Tmax and an engine actual torque Ta corresponding to the torque actually output by the engine, which is detected by the engine torque detecting means 29, i.e., a toque margin A4=Tmax−Ta is calculated. Correction gains having values of 0 to 1 are determined using a correction gain table A5 with the torque margin A4 as a parameter. The correction gain table A5 is determined in accordance with such a table as shown in FIG. 5, for example. In FIG. 5, a threshold value Tc is determined in regard to the torque margin A4, and the correction gain is taken as 0 because when the torque margin A4 is larger than the threshold value Tc, there is a margin in the engine 1. With the determination of the correction gains in this manner, the I control is not performed on the motor generator 2 and the power running torque command value is calculated only by the P control. It is therefore possible to reduce steady electric power consumption. On the other hand, when the torque margin A4 is smaller than the threshold value Tc, it is necessary to perform an assist output limit of the motor generator 2 within the range in which the engine stall does not occur, because there is no margin in the engine 1. Thus, the correction gains are determined so as to have the values of 0 to 1. This table is one example. When the torque margin A4 is 0, the correction gain is set to 1. When the torque margin A4 is larger than Tc, the correction gain is set to be 0.

After the rotational speed deviation based on the deviation ΔN between the target rotational speed of engine and the actual rotational speed of engine is multiplied by the correction gain determined in this manner, the result of multiplication is multiplied by the integral gain (Ki) A6. As with the case where it has been determined that above ΔSOC>0, a power running torque command value based on the I control is calculated through the integrator with the limiter.

With such a structure as described above, the output suppression of the motor generator 2 corresponding to the output margin of the engine is performed in a case where the state of charge is lower than the estimated state of charge. It is therefore possible to prevent the motor generator 2 from performing an excessive engine assist and decrease the amount of electric power consumption of the electric storage device 14, thus making it possible to efficiently use the charged power of the electric storage device 14.

As described above, the gains of the PI control and PID control that are general control techniques for the motor generator 2 are adjusted to make it possible to easily realize the restriction of the amount of an assist by the motor generator 2.

Incidentally, although one example of the PI control is shown in FIG. 6, it can also be applied to structures such as proportional control (P control), proportional integral differential control (PID control), etc. Also the correction gain can be applied not only to an integral term but also to a proportional term and a differential term. Further, the use of correction gain tables respectively different for the proportional, integral and differential terms enables flexible correspondence.

Although the present embodiment has shown the structure in which the power running assist amount by the motor generator 2 is restricted based on the engine torque, it is also possible to adopt a structure corresponding to the margin of the engine output. When this structure is adopted, the power running assist amount by the motor generator 2 is suppressed by using the plus and minus of the deviation ΔSOC and the output margin of the engine, which is the difference between the maximum engine output and the actual engine output.

The controller 8 has a pump tilt control means 28. The pump tilt control means 28 calculates a pump tilt rotation command for operating a tilting angle of the hydraulic pump 3, based on a pump load detected by a pump load detecting means 30 and an assist output determined by the assist output computing means 27. The calculated pump tilt rotation command is output to the pump 3.

Further, when the sum of the power running assist by the motor generator 2, which has been suppressed by the above method, and the output of the engine 1 falls below the pump load, and the power running assist by the motor generator 2 cannot be performed with no state of charge, the pump tilt control means 28 is controlled based on the motor torque command value computed by the assist output computing means 27 as shown in FIG. 2 to operate the tilting angle of the hydraulic pump 3 and thereby reduce the pump load, whereby an engine stall is avoided.

EXPLANATION OF REFERENCE NUMERALS

1 Engine
2 Motor generator
3 Hydraulic pump
4 Valve device
5 Actuator
6 Rotational speed sensor
7 Governor
8 Controller
9 Inverter
10 Condenser
11 Current sensor
12 Voltage sensor
13 Temperature sensor
14 Electric storage device

The invention claimed is:

1. A hybrid construction machine comprising:
an engine;
a motor generator mechanically connected to the engine to perform a generator operation and an electric motor operation; and
an electric storage device which supplies power to the motor generator,
wherein the hybrid construction machine has control means which calculates a motor torque command value to be output to the motor generator and controls the motor generator based on the motor torque command value,
wherein the control means compares an actual state-of-charge being detected by a state-of-charge detecting means, with a target state-of-charge set by the target state-of-charge setting means, and when the actual state-of-charge falls below the target state-of-charge, calculates the motor torque command value on the basis of an output limit, a target rotational speed of the engine, and an actual rotational speed of the engine, the output limit being determined by output limit determining means based on a torque margin obtained by a difference between a maximum torque of the engine and an actual torque of the engine, the maximum torque of the engine being decided by engine maximum torque setting means on the basis of the actual rotational speed of the engine, the target rotational speed of the engine being decided by target rotational speed setting means.

2. The hybrid construction machine according to claim 1, wherein when an actual state-of-charge of the electric storage device exceeds a target state-of-charge set in advance for the electric storage device, the motor torque command value is smaller than a motor torque command value calculated based on a torque margin obtained by the difference between a maximum torque of the engine decided on the basis of an actual rotational speed of the engine and an actual torque of the engine.

3. The hybrid construction machine according to claim 1, wherein the motor torque command value is calculated corresponding the magnitude of the torque margin, and a motor torque command value calculated in a case where the torque margin is larger than a threshold value is smaller than a motor torque command value calculated in a case where the torque margin is smaller than the threshold value.

4. The hybrid construction machine according to claim 1, wherein the motor torque command value is calculated by proportional integral control based on a rotational speed deviation corresponding to a difference between a target engine speed to be output to the engine and an actual engine speed of the engine, and
wherein when the torque margin is smaller than a predetermined value, an integral gain used in integral control performed at the proportional integral control is smaller than an integral gain used in a case where the value of an actual state-of-charge of the electric storage device is determined to exceed the value of a target state-of-charge set in advance for the electric storage device, and when the torque margin is larger than the predetermined value, the integral gain is taken as 0.

5. A hybrid construction machine comprising:
an engine;
a motor generator mechanically connected to the engine to perform a generator operation and an electric motor operation; and
an electric storage device which supplies power to the motor generator,
wherein the hybrid construction machine has control means which calculates a motor torque command to be output to the motor generator, and
wherein, when the value of an actual state-of-charge of the electric storage device falls below the value of a target state-of-charge set in advance for the electric storage device, the control means calculates a motor torque command value according to the magnitude of an output margin obtained by a difference between a maximum output of the engine determined based on an actual rotational speed of the engine and an actual output of the engine.

6. The hybrid construction machine according to claim 5, wherein the motor torque command value is calculated by proportional integral control based on a rotational speed deviation corresponding to a difference between a target engine speed to be output to the engine and an actual engine speed of the engine, and
wherein when the output margin is smaller than a predetermined value, an integral gain used in integral control performed at the proportional integral control is smaller than an integral gain used in a case where the value of the actual state of charge of the electric storage device is determined to exceed the value of the target state of charge set in advance for the electric storage device, and when the output margin is larger than the predetermined value, the integral gain is taken as 0.

* * * * *